(12) United States Patent
Markova et al.

(10) Patent No.: US 10,049,463 B1
(45) Date of Patent: Aug. 14, 2018

(54) METHOD FOR ACCURATELY ALIGNING AND CORRECTING IMAGES IN HIGH DYNAMIC RANGE VIDEO AND IMAGE PROCESSING

(71) Applicant: PINNACLE IMAGING CORPORATION, Belmont, CA (US)

(72) Inventors: Elena Aleksandrovna Markova, Moscow (RU); Klimkovich Anton Grigor'evich, Brest (BY); Vanjushin Igor' Valer'evich, Moscow (RU)

(73) Assignee: Pinnacle Imaging Corporation, Belmont, CA (US)

( * ) Notice: Subject to any disclaimer, the term of this patent is extended or adjusted under 35 U.S.C. 154(b) by 0 days.

(21) Appl. No.: 15/432,149

(22) Filed: Feb. 14, 2017

(51) Int. Cl.
  *G06K 9/32* (2006.01)
  *G06T 7/33* (2017.01)
  *G06T 7/00* (2017.01)
  *G06T 7/35* (2017.01)

(52) U.S. Cl.
  CPC .......... *G06T 7/344* (2017.01); *G06T 7/35* (2017.01); *G06T 7/97* (2017.01); *G06T 2207/20208* (2013.01)

(58) Field of Classification Search
  None
  See application file for complete search history.

(56) References Cited

U.S. PATENT DOCUMENTS

2009/0167932 A1*  7/2009  Nakajima .......... H04N 5/23219
                                                348/362

* cited by examiner

*Primary Examiner* — Idowu O Osifade
(74) *Attorney, Agent, or Firm* — Rosenberg, Klein & Lee

(57) ABSTRACT

An alignment method for high dynamic resolution imaging searches and detects features in an image and parameterizing the features. Then differently exposed images are compared by comparing the features. Additionally the method detects features in an image, performs shape adaptive filtering using scaling pyramids, determines trajectories, calculates a range of characteristics for each unit in the image, and compares characteristics of paired units to select or eliminate the pair. Paired unit characterization selects unit pairs, selects unit pairs by statistical analysis, performs cluster analysis, calculates alignment parameters, and performs additional correction of the alignment parameters. The brightness channel is used for objects detection.

9 Claims, 3 Drawing Sheets

METHOD FOR ACCURATELY ALIGNING AND CORRECTING IMAGES IN HIGH DYNAMIC RANGE VIDEO AND IMAGE PROCESSING

BACKGROUND OF THE INVENTION

Field of the Invention

The present invention relates to digital imaging. More specifically, the present invention discloses a method for accurately aligning and correcting images in high dynamic range video and image processing.

Description of the Prior Art

High dynamic range imaging is used to reproduce a greater dynamic range of luminosity in imaging and photography. A conventional technique of high dynamic range imaging includes utilizing special image sensors for oversampling. Another technique involves merging multiple images.

However, the special image sensors often encounter difficulty when used in low light conditions which produces a non-optimal resultant image. Additionally, digital image encoding does not always offer a great enough range of values to allow fine transitions which causes undesirable effects due to lossy compression.

Therefore, there is need for an efficient alignment method for accurately aligning and correcting images in high dynamic range video processing that produces superior high dynamic range video at a high frame rate.

SUMMARY OF THE INVENTION

To achieve these and other advantages and in order to overcome the disadvantages of the conventional method in accordance with the purpose of the invention as embodied and broadly described herein, the present invention provides an efficient method for accurately aligning and correcting images in high dynamic range video and image processing.

When a High Dynamic Range (HDR) image is being created through merging of a series of Low Dynamic Range (LDR) images, the LDR images are usually being taken with different exposure times (using exposure bracketing to cover some necessary dynamic range) or ISO values. This requires taking images at different shot times, which can cause misalignment of the LDR images when the camera was moving or shaking during shots (i.e. cameras without a tripod). For this situation special algorithms are required to align and correct the images before the merging into an HDR image.

Following is a description of the alignment method which is based on separate objects detection and analysis.

The method comprises a step of searching for the features (characterizing elements) in an image, a step of parameterization of those features, and a step of comparison of differently exposed images by comparing the features.

The brightness channel is used for objects detection. Also, other color channels of the image can be used as a source of additional parameters for objects recognition.

The brightness channel is represented in a logarithmic scale as its distribution on a discrete space of pixel coordinates. It is intended that the brightness channel is continuous (on the discrete space) over the whole image, and its first and second spatial numerical derivatives (defined on the discrete space) exist and have finite values at any (x,y) point of the brightness channel.

Since the brightness channel is analyzed in a logarithmic scale on the basis "2" (EV scale), black and white levels limitations are introduced for all pixels in the image by the following limits:
  Black level is limited as −32 EV;
  White level is limited by a maximal possible value in the initial image data representation and in the EV scale is equal to 0.0 EV.

This means that there will be no values above 0.0 EV but all values below −32 EV should be set to −32 EV.

For the given algorithm, objects in the image are supposed to be constructed from their smallest detectable parts—details. For objects parametric representation the notions of trajectory, stream and unit are used. Trajectories are the trivial features characterizing an image. They compose streams, and streams compose units. Comparison of the details between two images will be performed through comparison of their relevant units' parameters.

Each unit is intended to have just one reference point (center), which reflects a single extremum point of the brightness channel.

Any unit contains a sufficient set of parameters, which will characterize its relevant detail:
  shape (including brightness distribution characteristics);
  size;
  position;
  orientation; and
  brightness distribution of its pixels etc.

For better accuracy and for wider recognition possibilities, some smaller gradient-like components of units—streams—are introduced here. So, the units are intended to be nontrivial parts of the image parameterization, and they can be separated into their smaller trivial parts. Any stream contains a sufficient set of parameters, which characterizes its relevant trivial detail's part. Streams parameters construct the parameters of its' unit. A stream can belong to several neighboring units (coupling the units' centers).

An image can also be represented as a set of objects, and any object parameterization will be characterized as a unique combination (aggregation) of appropriate units, and these units—as unique combinations of their composing elements.

Since details in the image can be of different sizes and significance, and some of them can construct objects of different shapes and sizes, for performance and recognition improvement the objects detection and parameterization is performed through scaling pyramid. The pyramid consists of scaling levels. Each level characterizes objects separation into their smallest (for the current level) nontrivial parts. These small parts, in turn, can be separated into their smaller nontrivial parts on the lower pyramid level, and so on.

Aggregation of units of the given level into units of the next level is defined through coupling elements of neighboring units.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
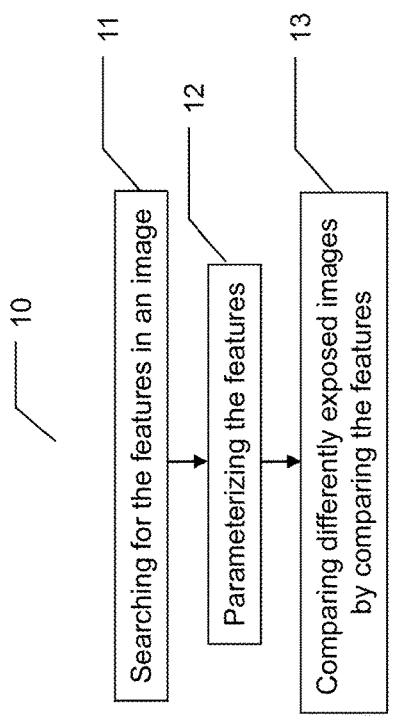
FIG. 1A is a flowchart illustrating a method for high dynamic resolution video and image processing according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 1A, which is a flowchart illustrating an alignment method for high dynamic range imaging according to an embodiment of the present invention.

The method 10, begins in Step 11 by searching for the features (characterizing elements) in an image. Next, in Step 12 the method continues with a step of parameterization of those features. And Step 12 comprises a step of comparison of differently exposed images by comparing the features.

Figure 1B:
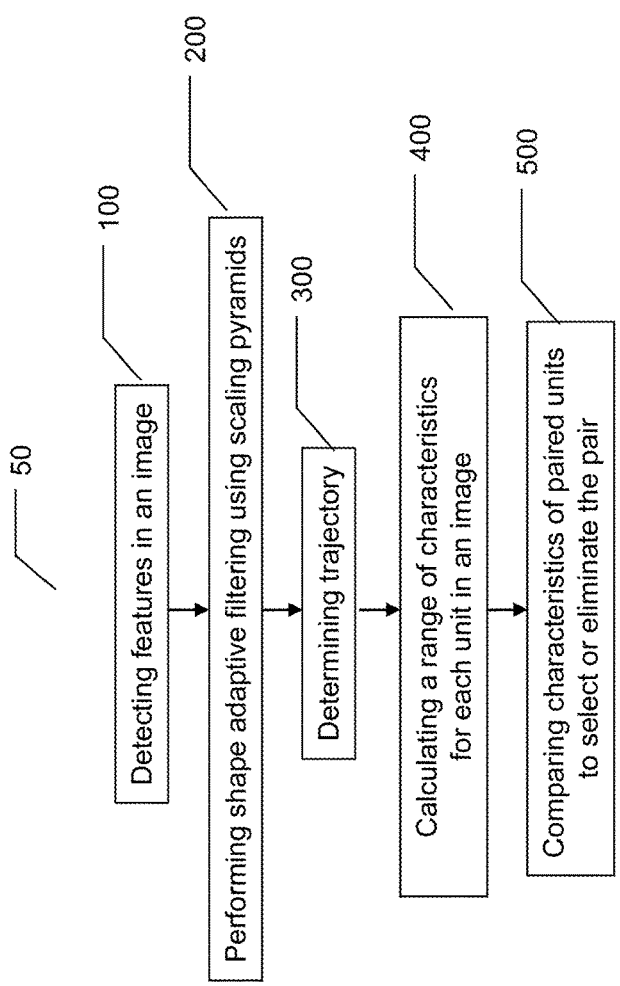
FIG. 1B is a flowchart illustrating a method for high dynamic resolution video and image processing according to an embodiment of the present invention.

Refer to FIG. 1B, which is a flowchart illustrating an alignment method for high dynamic range imaging according to an embodiment of the present invention.

The method 50 begins in Step 100, by detecting features in an image.

In order to find details in an image and get some parametric representation of them (units), some spatial filtering procedures are applied to the image. Filtering allows detection of as much useful information as possible while rejecting spatially non-correlated data (as noise, for example). Parameters of the units are being found as responses of characteristic filters on the image details.

During filtering, classical square-kernel image filtering is avoided, because of well known problems of such constantly distributed symmetrically shaped FIR filters:

- The filter should be spatially symmetric, so it always has circular symmetry for its elements distribution. Thus, this filter can give a response just on the details' size, and it is not always aware of the shape. That's why, for arbitrary shaped details analysis, filters of different sizes should be used.
- Application of a fixed-pattern filter usually requires multiple convolution operations, so, the bigger filter's aperture, the bigger amount of multiplications are required for each pixel position before integration. Since for different details' sizes all set of convolutions with different apertures sizes are also required (to analyze the whole spectrum of sizes), the amount of calculations grows significantly.
- Data losses take place because any shapes and sizes of characterizing details proper apertures are not used.

In Step 200, shape adaptive filtering using scaling pyramids is performed. For the given elements detection algorithm an arbitrary shaped filtering is introduced, which detects elements by fitting noticeable details with the aid of adaptively shaped filters, whose shapes (and characteristic sizes) are (in turn) defined by the details themselves.

In the present invention the brightness channel of the image is treated as a quasi-static potential phase field. Each detail of the image has its own unique local potential distribution as a part of the field.

In Step 300, trajectories are determined. In order to detect and parameterize details, first, the potential phase field is being analyzed through quasi-dynamic behavior of an imaginary "charged probe particle" placed at any (x,y) point of this field. The particle behavior is described here by means of a single unique trajectory formed by the motion of this particle along an instantaneous local gradient at the current particle's (x,y)-position in the field.

Analysis is performed for both positive and negative charges of the particle. The darker areas of the field have negative spatial charges, which attract positively charged particles, and vice-versa, bright areas of the field have positive spatial charges, which attracts negatively charged particles. The darker and brighter areas of attraction have their appropriate points of attraction (or cycles) where averaged gradient is equal to zero. Any trajectory by both positive and negative probe particles placed subsequently at the same initial (x,y) coordinate on the phase field and then moved along an instantaneous local gradient of the field is analyzed. For a positive charged particle its point of attraction will be denoted as (−) point (dark point), and for a negative charged particle its point of attraction will be denoted as (+) point (bright point). Since the motion of positive and negative particles start from the same initial (x,y) position, this motion will construct a trajectory, which is similar to an "electrical current channel" between (+) and (−) points. That's why (+) and (−) points of the trajectory are denoted as starting and ending points accordingly. Starting and ending points are considered potential values, and the brightness difference between them is considered as a potential difference.

For the spatial filtering just the geometry of this particle motion is analyzed. Its velocity or acceleration can be used in further analysis as additional recognition parameters.

As described above, the brightness channel (as potential field) is continuous over the image and its spatial derivatives have finite values at any point, so any trajectory is definable on the field and, if the brightness channel has any area with nonzero gradient values (which can be treated as a "detail"), there is at least one non-zero sized trajectory, which has its attractive steady points (including points at infinite distance).

In embodiments of the present invention there are several ways to calculate local gradient, and some of them allow steady cycle trajectories. For steady cycles, their center points can be considered as steady points (i.e. the trajectory's endings).

For some other methods the situation of indeterminateness can take place when there is more than one possible direction for the particle to move from the current position. In this case the trajectory can branch creating several new trajectories which share some pixels while having different starting and/or ending points.

The absolute gradient value is not equal to zero at any point of the trajectory, except for its starting and ending points, so the trajectory is always continuous on the discrete space of the brightness channel.

Each finite trajectory, which has both steady points ((+) and (−)) inside the image boundaries and has its length larger than some minimal length value, can be used to parameterize a detail.

Under the term «trajectory», a unique continuous channel with two end-points ((+) and (−)) for motion of a "charged probe particle", is used.

Trajectories are obtained through point-by-point motion in the direction of highest local gradient. Local gradient can be calculated for the central pixel in the 3×3 (or more generally n×n) pixels aperture.

In Step 400, a range of characteristics for each unit in an image is calculated. Suppose all the possible trajectories have been built for the given B channel (brightness channel of some image). The starting and ending points of those trajectories become centers of units. If there are two units which share one ore more trajectories then the set of all those common trajectories is called a stream. Streams are elements which construct unit's parameterization. A stream has its starting point and ending point derived from its composing trajectories.

Thus, the Shape Adaptive Image Filtering (SAIF) is constructed as a procedure, where elements are defined as streams formed by the trajectories.

Unit is an area of the image which consists of a central pixel, in which the brightness function B(x,y) reaches an extremum, and of all the streams of the image which have their starting or ending point in that pixel. The units which correspond to local minimums of B function are called dark units. Otherwise they are called bright units.

For each unit in the image a range of characteristics is calculated. In an embodiment of the present invention the implementation of the algorithm comprises the following characteristics:

Either the unit is dark or bright;
The units' center brightness $B(x_c, y_c)$;
Number of streams;
Luminance differences between the streams starting and ending points;
Square area covered by the units pixels;
For each trajectory of the unit: its length, calculated, for example, as a sum of distances between each two neighboring pixels of the trajectory, so that for the pixels with the same x or y coordinate the distance equals 1, and in other cases it equals $\sqrt{2}$;
For each stream: its length, calculated, for example, as root mean square of the comprised trajectories;
For each stream: its «vector» as a directed line segment with its starting and ending points coinciding with the starting and ending points of the stream accordingly;
For each stream: its embroidery as the quotient obtained when its length is divided by the length of its vector; and
For each two neighboring streams of the unit: the angle between their vectors.

In other embodiments other characteristics are used as well.

The described set of characteristics can serve for the units comparison between differently exposed images in order to find corresponding elements of the images. The specific property of the characteristics is that they are invariant to any shift and rotation of one image relatively to another, which makes it possible to use them for images alignment to overcome problems in HDR image creation. If at least two pairs of units are found, the angle and shift for the alignment can be easily calculated.

An example of a pyramid based on a classical filter with the Gauss kernel is the so-called Gauss pyramid. The B channel is taken as its zero level. Given k'th level, the k+1 level is being formed as following: the Gauss filter with constant radius r is being applied to the pixels of the k-level image in increments of r+1. For example, the 3×3 filter is being applied to every other pixel. The Gauss kernel is set by the function:

$$f(x) = \frac{1}{\sigma\sqrt{(2\pi)}} \exp\left(\frac{(r-\mu)^2}{2\sigma^2}\right) \quad (1)$$

In the current implementation the parameters are set to σ=1, μ=0.

The resulting values form an image with $$\text{width}_{k+1} = \frac{\text{width}_k}{2r+1}, \text{height}_{k+1} = \frac{\text{height}_k}{2r+1},$$

which becomes the level number k+1.

Creation of new levels proceeds while the highest levels' width and height are larger than some established $\text{width}_{min}$, $\text{height}_{min}$ values.

In another embodiment of the present invention, another version of the algorithms' implementation uses the kind of pyramid in which the lower level elements (units, streams, trajectories) are being taken as a basis for the higher levels elements construction.

In this embodiment a pixel is considered as a trivial unit which only consists of its central point and does not contain streams of non-zero length, and the B channel of the original image is taken as the zero level of the pyramid.

The algorithm of trajectories construction described above is used for the first-level elements construction. Therefore, in the defined terms the imaginary particle, which draws the 1st-level trajectories, moves from one unit of the zero level to another sequentially by the law derived from the relative brightness of the neighboring units. The trajectories of the k=2 . . . N levels should be constructed analogously. Each of the (k+1)-level trajectories contains units of the k'th level as its joints and its starting and ending points.

The units which share streams are called neighboring units.

The trajectories construction process on the higher levels requires a method of determining a direction of the imaginary particles movement, analogously to the gradient estimation on the zero level.

For example, the following way can be used: suppose the negatively charged particle is set to a bright unit $U_o^B$, which obviously has only dark neighboring units $U_1^D \ldots U_K^D$. Then the unit where the particle will move to on the next step is the brightest unit $U_s^B$, in the union of all the bright units neighboring to the $U_1^D \ldots U_K^D$ units, except for $U_o^B$, and only in case if $U_s^B$ is brighter than $U_o^B$ (in terms of average brightness). To find such a unit the function of a units' average brightness estimation is needed.

That function can, for example, calculate average brightness of a unit as an average of all the pixels which compose the unit, or as an average of all the streams' average brightness. Thus the particle jumps to $U_s^B$, and the dark unit $U_l^D$, l|1 . . . K neighboring to $U_s^B$ will be added to the current trajectory as a joint.

In case there are more than one possible choice of $U_s^B$ and/or $U_l^D$ the trajectory will branch.

The positively charged particle will move from a bright unit to the darkest of its neighboring units.

In case when the starting unit is dark, the choice of the particles movement direction is performed symmetrically.

Once a trajectory has stopped at one of the k−1 levels units, this units' center becomes the center of the new k levels' unit. As the new k level trajectory consists of several k−1 level trajectories linked together, its length can be calculated as a sum of the lengths of those trajectories. Other elements' characteristics can also be calculated analogically to the previous level.

Each level of a pyramid's units can be constructed and used to compare the corresponding levels of different pictures. Thus on each level an angle and shift for alignment can be found.

The higher the level indicates the rougher this estimation is. On the other hand, the basic level is usually noisy, which can detrimentally affect the precision. Therefore all levels should be taken into account in order to perform the alignment with the best possible precision.

Any pair of units itself provides its values of angle and shift of one image relatively to another. Suppose the units $U_1$ and $U_2$ are coupled. Then the distance between their centers sets the shift, and the angle between their corresponding streams sets the rotation angle. When all possible pairs of units are found on the current level, the special algorithm is needed to average the angles and shifts they set.

Suppose the algorithm has returned the values $(dx_k, dy_k)$ of shift and $\alpha_k$ for rotation angle after the averaging process on level k. Then after going down to the k−1 level, for each two units which are supposed to be coupled the values of the shift and the rotation angle they set must not differ much from the $(dx_k, dy_k)$ and $\alpha_k$ values. Otherwise the pair is to be eliminated.

In Step 500, the characteristics of paired units are compared to select or eliminate the pair. An effective algorithm of units comparison poses one of the key problems for alignment.

Figure 2:
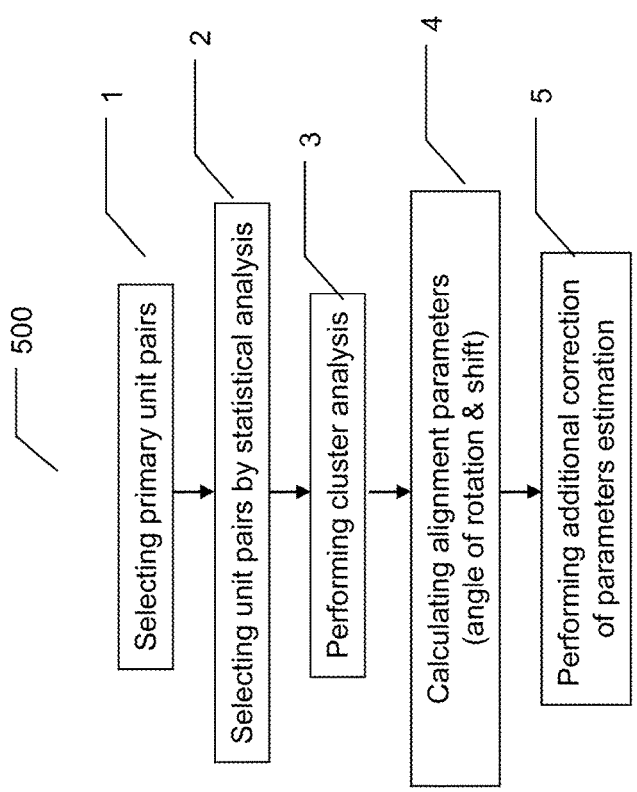
FIG. 2 is a flowchart illustrating an alignment method of units comparison according to an embodiment of the present invention.

The alignment method of units comparison of the present invention comprises the following steps as illustrated in FIG. 2.

Step 1. Primary Selection of Pairs

In Step 1 a large amount of pairs is usually formed, most of which can be eliminated in the further steps.

The comparison in this step is based on estimation of difference of the main unit's characteristics. Each characteristic can have its individual function for difference estimation.

Suppose the images $l_1$ and $l_2$ are being compared. Each unit $u_{1\ i}$ of $l_1$ is being compared to each $u_{2\ j}$ of $l_2$, if both $u_{1\ i}$ and $u_{2\ j}$ are dark or both are bright.

The first check uses such parameters as square area and number of streams. If the parameters differ by a large value then the pair is being eliminated.

Suppose $S_{11} \ldots S_{1\ N_1}$ are all the streams which belong to $u_{1\ i}$ and $S_{21} \ldots S_{2\ N_2}$—are those of $u_{2\ j}$.

For each of $u_{1\ i}$ and $u_{2\ j}$ a «characterizing» stream is chosen to start the comparison with. For example, the streams $S_{1\ n^1}$, $S_{2\ n^2}$ with the maximal embroidery can be taken: $E(S_{kn^k}) = \max_n E(S_{kn})$.

The centers of the units are being aligned, and the $u_{2\ j}$ is being rotated relatively to the $u_{1\ i}$ until the chosen streams coincide.

For each stream $S_{kn}$ the angle $\alpha_{kn}$ is introduced between it and the characterizing stream of the unit when moving clockwise.

The most interesting parameters are selected for streams comparison. In an embodiment of the present invention streams embroidery, length and vectors' length are used.

Then the iteration over streams is performed, clockwise or counterclockwise. Beginning with the first coinciding streams $S_{1\ n_1}$ and $S_{2\ n_2}$, each pair of streams which have an angle $|(\alpha_{1\ n}-\alpha_{2\ n})|$ between them smaller than a predetermined $\in_\alpha$, the values characterizing the agreement by the chosen parameters are being calculated and stored into memory. Those values can be the ratio of those parameters provided the denominator differs from 0.

If $\in_\alpha$-neighborhood of a stream of one of the units does not contain any stream of another unit, then the value which corresponds to the minimal possible likeness by each of the parameters is stored. After all the iterations over the streams are completed, the stored values are averaged and the result reflects the likeness of the units.

There can be different ways of choosing the first characterizing streams $S_{1\ n^1}$, $S_{2\ n^2}$ for comparison. The described algorithm of the present invention can be repeated several times with different choice of $S_{1\ n^1}$, $S_{2\ n^2}$ and the variant with the maximal resulting value of likeness can be used to decide whether the units should be coupled or not.

Each pair $u_{1\ i}$, $u_{2\ j}$ which has passed the stages described above can then be checked with use of some additional parameters, for example differences of brightness between the endings of the coinciding streams should not differ much.

Step 2. Selection with Statistical Approach.

The second step works with the set of pairs $p_1 \ldots p_N$ collected in Step 1 and considers random variables: the angle $\alpha$, and the shifts dx и d along the two axis of an image. Their mean values correspond to the target parameters of alignment. The $\alpha_i$, $dx_i$ и $dy_i$, provided by a pair $p_i$, can be thought of as the i-th measurement of those variables.

Thus there are N measurements available. In practice, N is usually large enough to estimate the target variables. By the N measurements the distribution graphs of the random variables can be constructed. That graph can be plotted as a histogram with values of the random variables along the abscises axis and the amount of the measurements, which fell into each interval, along the ordinates axis. If a histogram reaches a distinctive maximum at some point then that maximum reflects the mean value of the corresponding random variable. Thus in this step all the pairs which fall far from that maximum are eliminated.

Actually each of the three histograms will set a different set of selected pairs, therefore the intersection of those sets can be taken as a resulting set of pairs. In practice, this set is usually not empty and large enough to perform alignment, provided the significant number of pairs has been gained in Step 1.

Step 3. Cluster Analysis

In cases where the number of the unit pairs formed Step 1 is not large (for example about 30 or less), cluster analysis can be performed instead of (or along with) statistical analysis. Units in pairs are put in order (the first is the unit of the key image and the second is of the image which is to be aligned). The process of alignment when centers of the units of the second picture are being set to the centers of the units of the first picture can be thought of as movement. The goal is to find the maximal subset in the set of all pairs such that all the units of this subset which go second in their pair move together as a solid body. All the pairs beyond this subset are eliminated from the alignment process. In order to find the described subset different approaches can be used. For example all the centers of the potential subset can be linked with line segments. Thus it can be seen if the lengths of those segments and the angles between them are not changed during the movement (or the changes are minimal).

Using these criteria the pairs can be eliminated by ones and it can be estimated how much the lengths and the angles change in the process of movement of the remaining pairs. Thus the pair exclusion of which leads to the best result can be found and eliminated and then the procedure can be repeated with the remaining pairs.

Step 4. Alignment Parameters (Angle of Rotation and Shift) Calculation.

The pairs selected in the previous steps are being used for the angle and shift approximation.

The angles between the corresponding streams of the coupled units are no longer used for the target angle estimation. The coordinates (x,y) of the units centers are of interest, and an algorithm is used which calculates such angle and shift of an image alignment (not taking possible optical distortions into account) which provide the least mean square variation of all the coupled units centers coordinates.

In this way the first approximation of the alignment parameters is obtained.

Step 5. Additional Correction of the Parameters Estimation.

Some additional correction of the angle and shift values is often required. For that purpose the pairs of units which had been eliminated in Step 2 are brought back into consideration. Then those which set angle and shift close enough to those later obtained are added to the final set of pairs for alignment. Then the calculations are repeated with participation of the retrieved pairs centers.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An alignment method for high dynamic resolution imaging comprising:
    applying spatial filtering to an image to detect details while rejecting spatially non-correlated data;
    performing shape adaptive filtering using scaling pyramids;
    detecting elements by fitting noticeable details with aid of adaptively shaped filters whose shapes and characteristic sizes are defined by the noticeable details;
    utilizing brightness channel of the image as a quasi-static potential phase field;
        wherein each detail of the image has its own unique local potential distribution as a part of the quasi-static potential phase field;
    determining trajectories of a particle's motion along an instantaneous local gradient at the particle's position in a field;
    performing analysis for both positive and negative charges of the particle;
        wherein darker areas of the field have negative spatial charges which attract positively charged particles, and brighter areas of the field have positive spatial charges which attract negatively charged particles;
    analyzing trajectory of both positive and negative probe particles at a same initial coordinate in the field and then moving along an instantaneous local gradient of the field;
    calculating a range of characteristics for each unit in the image; and
    comparing characteristics of paired units to select or eliminate the paired units.

2. The alignment method for high dynamic resolution imaging of claim 1, where black level of the brightness channel is limited to −32 EV and white level is limited by a maximal possible value in initial image data representation in an EV scale equal to 0.0 EV.

3. The alignment method for high dynamic resolution imaging of claim 1, where the step of calculating the range of characteristics comprises parameterizing trajectory, streams, and units.

4. An alignment method for high dynamic resolution imaging comprising:
    applying spatial filtering to an image to detect details while rejecting spatially non-correlated data;
    performing shape adaptive filtering using scaling pyramids;
    detecting elements by fitting noticeable details with aid of adaptively shaped filters whose shapes and characteristic sizes are defined by the noticeable details;
    utilizing brightness channel of the image as a quasi-static potential phase field;
        wherein each detail of the image has its own unique local potential distribution as a part of the quasi-static potential phase field;
    determining trajectories of a particle's motion along an instantaneous local gradient at the particle's position in a field;
    performing analysis for both positive and negative charges of the particle;
        wherein darker areas of the field have negative spatial charges which attract positively charged particles, and brighter areas of the field have positive spatial charges which attract negatively charged particles;
    analyzing trajectory of both positive and negative probe particles at a same initial coordinate in the field and then moving along an instantaneous local gradient of the field;
    calculating a range of characteristics for each unit in the image;
        wherein if two units share one or more trajectories a set of all common trajectories comprises a stream which constructs parameterization of the units; and
        wherein calculating the range of characteristics comprises:
            determining whether the unit is dark or bright;
            determining the units' center brightness;
            determining number of streams;
            determining luminance differences between the stream's starting and ending points;
            determining square area covered by the unit's pixels;
            calculating length of each trajectory of the unit as a sum of distances between each two neighboring pixels of the trajectory, so that for pixels with same x or y coordinate distance equals 1, and in other cases it equals square root of 2; and
            calculating length of each stream as root mean square of the trajectories; and
    comparing characteristics of paired units to select or eliminate the paired units.

5. The alignment method for high dynamic resolution imaging of claim 4, where the step of comparing characteristics of paired units comprises:
    selecting unit pairs;
    selecting unit pairs by statistical analysis;
    performing cluster analysis;
    calculating alignment parameters; and
    performing additional correction of the alignment parameters.

6. The alignment method for high dynamic resolution imaging of claim 4, where black level of the brightness channel is limited to −32 EV and white level is limited by a maximal possible value in initial image data representation in an EV scale equal to 0.0 EV.

7. The alignment method for high dynamic resolution imaging of claim 4, where in the step of determining trajectories steady cycle trajectories are allowed and center points are considered as steady points.

8. The alignment method for high dynamic resolution imaging of claim 4, where in the step of determining trajectories there are more than one possible direction for a particle to move from a current position.

9. An alignment method for high dynamic resolution imaging comprising:
- applying spatial filtering to an image to detect details while rejecting spatially non-correlated data;
- performing shape adaptive filtering using scaling pyramids;
- detecting elements by fitting noticeable details with aid of adaptively shaped filters whose shapes and characteristic sizes are defined by the noticeable details;
- utilizing brightness channel of the image as a quasi-static potential phase field;
  - wherein each detail of the image has its own unique local potential distribution as a part of the quasi-static potential phase field;
- determining trajectories of a particle's motion along an instantaneous local gradient at the particle's position in a field;
- performing analysis for both positive and negative charges of the particle;
  - wherein darker areas of the field have negative spatial charges which attract positively charged particles, and brighter areas of the field have positive spatial charges which attract negatively charged particles;
- analyzing trajectory of both positive and negative probe particles at a same initial coordinate in the field and then moving along an instantaneous local gradient of the field;
- calculating a range of characteristics for each unit in the image;
  - wherein if two units share one or more trajectories a set of all common trajectories comprises a stream which constructs parameterization of the units; and
  - wherein calculating the range of characteristics comprises:
    - determining whether the unit is dark or bright;
    - determining the units' center brightness;
    - determining number of streams;
    - determining luminance differences between the stream's starting and ending points;
    - determining square area covered by the unit's pixels;
    - calculating length of each trajectory of the unit as a sum of distances between each two neighboring pixels of the trajectory, so that for pixels with same x or y coordinate distance equals 1, and in other cases it equals square root of 2; and
    - calculating length of each stream as root mean square of the trajectories; and
- comparing characteristics of paired units to select or eliminate the paired units;
- performing cluster analysis on selected pared units;
- calculating alignment parameters; and
- performing additional correction of the alignment parameters.

* * * * *